June 11, 1963  E. J. DOUGLAS  3,093,271
MATERIAL-HANDLING DEVICE
Filed April 10, 1959  3 Sheets-Sheet 2
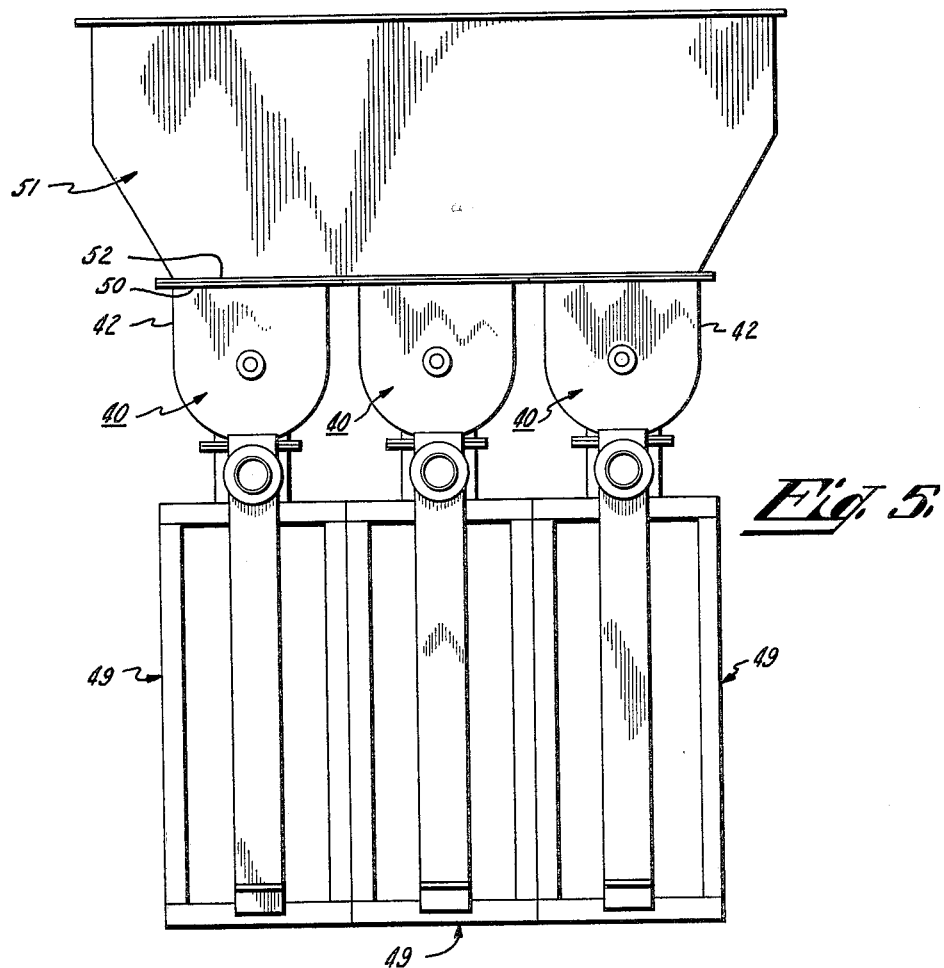
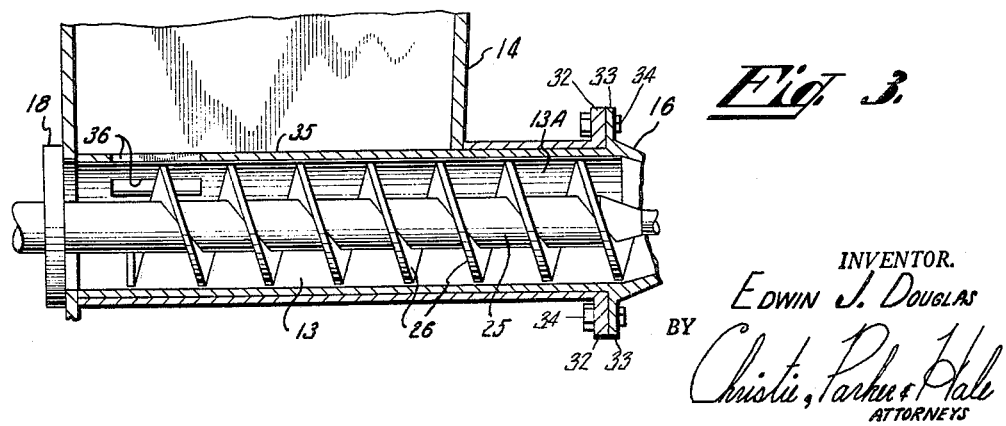
INVENTOR.
EDWIN J. DOUGLAS
BY
Christie, Parker & Hale
ATTORNEYS

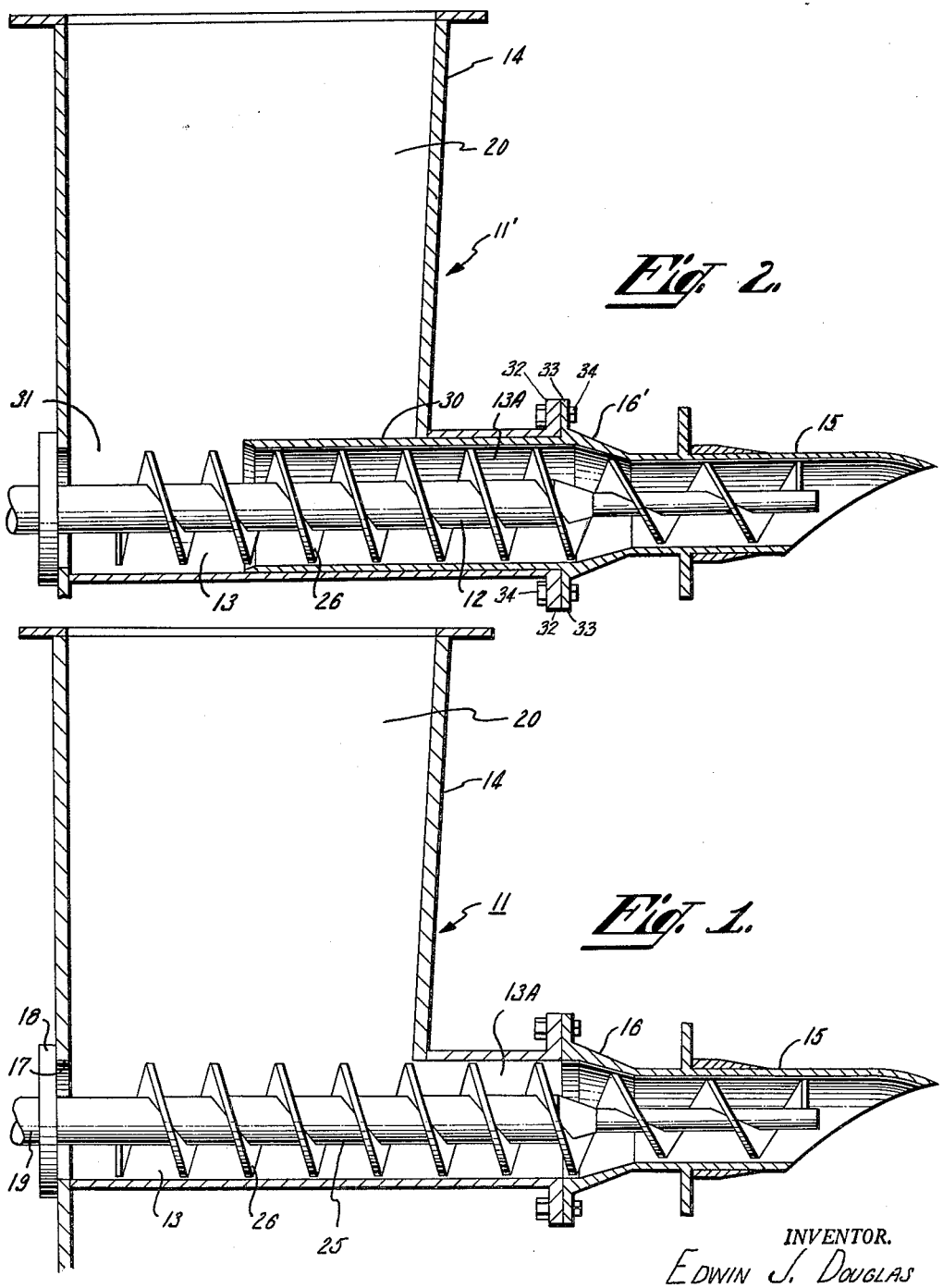

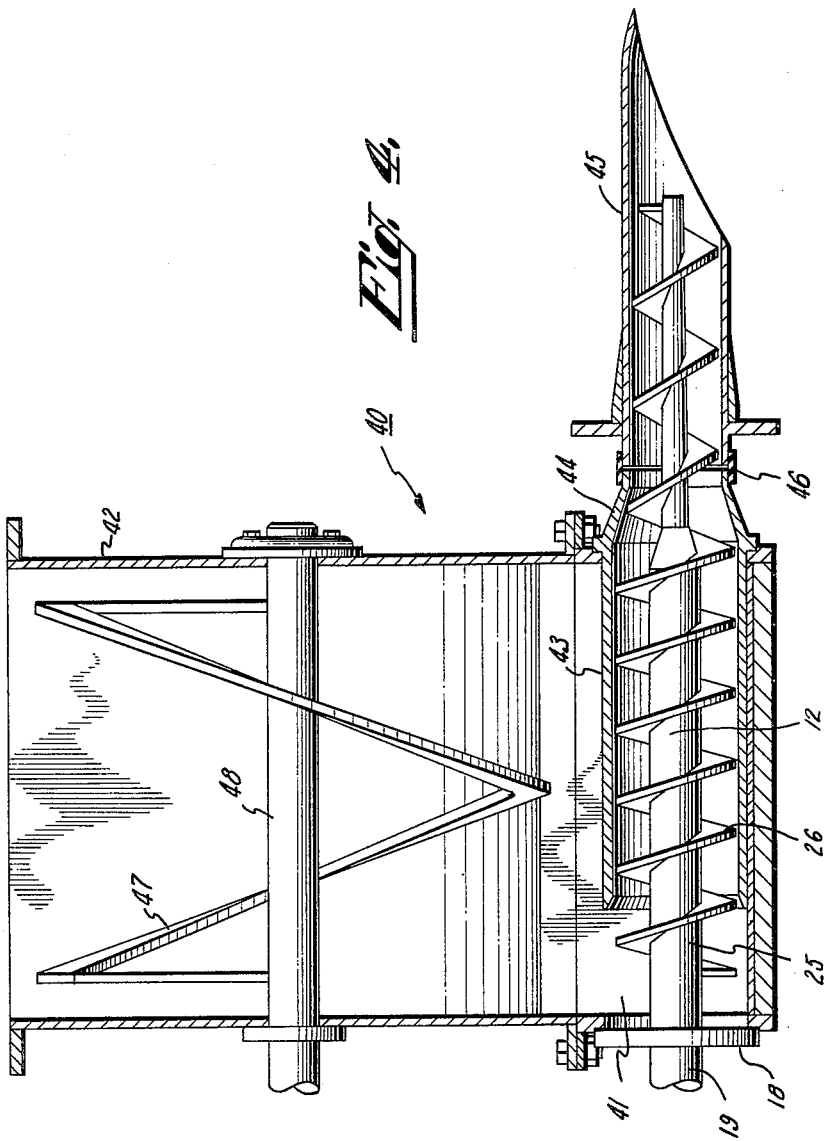

United States Patent Office 3,093,271
Patented June 11, 1963

3,093,271
MATERIAL-HANDLING DEVICE
Edwin J. Douglas, Whittier, Calif., assignor to H. L. Stoker Company, Claremont, Calif., a corporation of California
Filed Apr. 10, 1959, Ser. No. 805,397
4 Claims. (Cl. 222—413)

This invention relates to material-handling devices of the type consisting of a helicoid screw conveyor contained in a U-trough. More particularly, the invention relates to a sleeve adapted to enclose a substantial portion of the screw conveyor contained within the U-trough. The invention is particularly useful to prevent flooding of the material being conveyed by the screw conveyor, and may be utilized to enable a single device to handle a wide variety of materials.

Material-handling devices of the screw conveyor type are well known. An example of a device of this type is illustrated in U.S. Patent No. 2,548,075, issued April 10, 1951, to H. L. Stoker and entitled "Bag Packer." The present patent application is particularly utilizable with bag packers, and the discussion hereinafter will deal therewith, although use of the invention is not limited to bag packers.

Conventional bag packers consist essentially of a U-trough which contains a screw conveyor. A hopper is connected to the U-trough to feed material to be packed to the screw conveyor. The U-trough has an outlet section at one end through which the screw conveyor passes. The outlet normally consists of a tubular section to which is attached an outlet spout adjacent the end of the screw conveyor. The material to be packed is fed into the hopper, usually from a storage bin. The material is channeled by the hopper into the U-trough. The screw conveyor is rotated so as to transport the material contained between flights of the screw conveyor toward and through the outlet section. The material so transported passes into a bag connected to the spout.

Conventional bag packers have been used to pack materials of various sizes and densities into bags. Such bag packers have the disadvantage of not being adaptable for packing a wide variety of materials by means of a single bag packer. Therefore, it has been the practice heretofore to design and manufacture the bag packer for the particular material to be packed. For example, the space between the helical flights of the screw conveyor is designed with respect to the density and the particle size of the material to be packed. Clearance between the screw conveyor and the U-trough is also designed with reference to the particle size of material to be packed. In practice, packers for relatively dense materials are designed with closely spaced helical conveyor screw flights and with a minimum of clearance between the periphery of the flights and the U-trough. When materials of relatively light density and large particle size are to be packed, wide spacing between the flights and appreciable spacing between the periphery of the flights and the U-trough are used. Thus, it is apparent that the design for conventional bag packers is dependent upon the material to be packed.

Heretofore it has not been practical to utilize a packer designed for the packing of one material as a packer for another material having appreciably different particle size and density characteristics. If the bag packer described above, for packing dense materials is utilized to pack light materials of large particle size, the flow of the material through the screw conveyor is insufficient for satisfactory operation. The insufficient flow is due to the narrow spacing between the flights and the narrow clearance of the flight periphery with respect to the U-trough.

If the packer described above as designed for packing light materials of large particle size is utilized to pack dense materials of small particle size, unsatisfactory packing again results. The material to be packed flows through the helical path formed by conveyor screw flights without regard to whether or not the screw conveyor is being rotated to cause feeding. This flow occurs because the frictional resistance to flow offered by the helical path is insufficient to prevent the flow of material therethrough in response to pressure exerted by the material in the packer hopper.

Conventional bag packers are comparatively expensive. In many cases it has not been economically practical to utilize a bag packer when only a limited amount of material is to be packed, inasmuch as the bag packer cannot readily be converted to subsequently pack other material. Therefore, bag packers, designed with respect to the particular material to be packed, have not heretofore been used in applications involving packing a limited amount of material of relatively low value.

According to the present invention, a sleeve is placed in the U-trough so as to partially enclose the screw conveyor, thereby reducing the communication between the hopper and the screw conveyor. The sleeve passes through the U-trough outlet. Sleeves of varying lengths may be utilized to provide varying frictional resistances to the flow of material in accordance with the characteristics of the material to be packed so as to provide satisfactory packing without flooding. Thus, the sleeve operates as an anti-flood sleeve.

When used with conventional bag packers, the sleeve enables any material of which the packer hopper is capable of feeding to the U-trough, and the screw conveyor of transporting therefrom, to be packed. However, according to the invention, a detachable hopper may also be utilized. By utilizing a detachable hopper, an extremely wide variety of material may be packed, since hoppers are designed to feed different materials to the U-trough. Furthermore, a replaceable screw conveyor is utilized. By various combinations of hoppers, screw conveyors, and anti-flood sleeves, a single bag packer may be utilized to pack any material, whereas heretofore, such materials required specially designed bag packers. Thus, by utilizing the present invention, the expense of duplication of the weighing and drive apparatus for the bag packer is eliminated and a single bag packer assembly, with an assortment of relatively inexpensive anti-flood sleeves, screw conveyors, and hoppers, replaces the almost infinite variety of specially designed bag packers heretofore used. In addition, bag packers according to the invention may be set up in parallel and fed from a common material source to provide high capacity packing rates.

The invention may be more readily understood with reference to the accompanying drawing in which:

FIGURE 1 is a screw conveyor assembly, partially in section, of the conventional type;

FIGURE 2 is a conventional screw conveyor assembly, partially in section, utilizing the anti-flood sleeve of the invention;

FIGURE 3 is a partial section of an alternate embodiment of an anti-flood sleeve in a screw conveyor;

FIGURE 4 is a screw conveyor assembly, partially in section, according to the invention, utilizing a sleeve and a detachable hopper; and FIGURE 5 shows three bag packers connected so as to be fed from a single storage bin for parallel operation.

FIGURE 1 shows the construction of a bag packer screw conveyor assembly 11. The weighing assembly is not shown. A screw conveyor 12 is contained in a U-trough 13, the upper portion of which is connected to a hopper 14. The construction of the screw conveyor 12 is described in the aforementioned Stoker patent. The U-trough 13 has a cylindrical outlet portion 13A forming an open end of the U-trough 13, to which is connected an outlet spout 15 by a frusto-conical connecting section 16. The screw conveyor 12 may be removed from the U-trough 13 through a hole 17. A seal 18 seals the hole 17, so that the material contained in the hopper and U-trough will not pass therethrough. A drive shaft 19 connects the screw conveyor 12 to a conventional rotary drive source.

The hopper 14 has a hollow upper portion 20 into which the material to be packed is fed from a storage bin (not shown). The material to be packed settles into the U-trough 13 and is forced toward the spout 15 by the pressure of the material remaining in the hollow upper portion of the hopper 14. The frictional resistance which the material encounters in following the spiral path to reach the spout 15 overcomes the pressure of the material in the hollow upper portion of the hopper and thereby normally prevents the passage of material out of the spout 15.

When the drive shaft 19 is rotated, the screw conveyor 12 commences to rotate. As shown in FIG. 1, the screw conveyor 12 rotates counterclockwise in order to force material out of the spout 15. The counterclockwise rotation of the screw conveyor 12 reduces the frictional resistance to flow and forces the material to be packed out of the spout 15. When the desired amount of material is packed, the screw conveyor 12 is stopped, thereby preventing the further passage of material through the U-trough 13 and out of the spout 15.

The screw conveyor 12 consists of an axle 25 to which are connected helical flights 26. The spacing between individual of the helical flights 26 is determined by the density and particle size of the material to be packed.

If material of a small particle size and high density is to be packed, the helical flights 26 are spaced closely together. The diameter of the U-trough outlet 13A is made relatively small. In addition, the U-trough outlet section may be made comparatively long in order to provide a long rotary path which the material to be packed must follow. These design procedures are necessary in order to prevent flooding of the material to be packed. By flooding is meant the passage of material through the outlet section and the spout 15 due solely to the pressure exerted on the material therein by other material contained in the hopper container section 20, and not due to any rotary motion by the screw conveyor 12. When flooding occurs, the packing operation of the bag packer is no longer controllable, as material flows regardless of whether or not the conveyor screw is rotated.

Various methods of preventing flooding and thereby permitting a single bag packer to be used to pack a variety of materials have heretofore been tried. For example, a hopper insert which limits the flow of material through the hopper has been used. However, heretofore, no successful method for preventing flooding other than by overall design of the particular packer with respect to the particular material has been found. Therefore, the design of the bag packer feeder assembly 11 is controlled by the physical characteristics of density and particle size of the material to be packed.

When materials of light density and large particle sizes are to be packed, the helical flights 26 are spaced relatively widely apart and the U-trough outlet section 13A is made comparatively short. Appreciable clearance between the periphery of the flights 26 and the U-trough 13 may be utilized to accommodate the large particles. The U-trough outlet section may also be made with a large diameter in order to allow the particles of large size to pass therethrough. If, in a bag packer designed for packing large particles of light density, material of small particle size and high density is attempted to be packed, flooding will occur. Thus, it is not possible in the conventional bag packer to pack a variety of materials having widely differing physical characteristics of density and particle size.

FIGURE 2 illustrates the utilization of the present invention in a bag packer. The bag packer 11' is generally identical to the bag packer 11 of FIG. 1. The primary difference between the bag packer 11 (FIG. 1) and the bag packer 11' of FIG. 2 lies in the use of an anti-flood sleeve 30 surrounding a number of the screw conveyor flights 26 so as to enclose a substantial portion of the screw conveyor 12. The anti-flood sleeve 30, as shown in FIG. 2, is constructed integrally with the frusto-conical spout connection section 16' of the spout 15. The anti-flood sleeve 30 is inserted in the open end of the U-trough 13. The anti-flood sleeve 30 is attached to the U-trough 13 by means of a pair of lugs 32 on the U-trough and a mating pair of lugs 33 on the sleeve 30. Pairs of nut and bolt combinations 34 extend through aligned apertures (not shown) in the lugs 32 and 33 to attach the sleeve 30 to the U-trough 13. When a different sleeve 30 is to be inserted in the U-trough 13, the nut and bolt combinations 34 are released, the sleeve 30 removed from within the U-trough 13, and a new sleeve 30 inserted in the U-trough and attached thereto by its lugs 33 and nut and bolt combination 34. The material to be packed is fed into the hopper container section 20 and passes into the U-trough 13 at its rearmost portion 31. The anti-flood sleeve 30 prevents the material from entering directly that portion of the U-trough immediately adjacent the U-trough outlet section 13A. Thus, the use of the anti-flood sleeve 30 insures a longer helical path for the flow of material than would otherwise be required. By insuring this longer flow path, frictional resistance which is the equivalent of closer spacing of the conveyor flights 26 is provided. Therefore, with respect to materials having substantially similar particle sizes, flooding can be prevented when the same screw conveyor is used by varying the amount of the screw conveyor which is enclosed by the anti-flood sleeve.

When particularly dense and fine materials are to be packed, it is necessary to use an anti-flood sleeve 30 which encloses the entire length of the conveyor screw 12. In the embodiment shown in FIG. 3, the anti-flood sleeve 35 has longitudinal slots 36 which provide the means of ingress of the material to be packed to the helical flow path. The anti-flood sleeve 35 is attached to the U-trough 13 by nut and bolt combinations 34 extending through lugs 33 on the sleeve 35 and lugs 32 on the U-trough 13.

For a particular anti-flood sleeve, the range of characteristics of materials which may be packed satisfactorily is extended by the use of an appropriately designed conveyor screw 12. For example, utilizing the anti-flood sleeve 30 shown in FIG. 2, a conveyor screw 12 having comparatively widely spaced flights is utilized to pack dense material of large particle sizes. A conveyor screw having comparatively closely spaced flights is utilized to pack dense material of small particle size. The conveyor screws are removable. Therefore, by being able to select from a number of anti-flood sleeves and conveyor screws, an extremely wide variety of materials may be packed, the only limitation being whether the conventional hopper 14 is constructed so as to satisfactorily feed the material to the U-trough 13.

FIGURE 4 shows another embodiment of the material-handling device. A bag packer feeder assembly 40 consists essentially of the screw conveyor 12 contained in a U-trough 41. A hopper 42 is connected to the U-trough 41. An anti-flood sleeve 43 has a frusto-conically tapered connecting section 44 which is connected to a spout 45 by a seal 46. The hopper 42 has a horizontal ribbon agitator 47 contained therein by being mounted on an agitator drive shaft 48. The agitator drive shaft 48 may be driven by any conventional rotary drive source.

The construction of the U-trough 41 and the anti-flood sleeve 43 of FIG. 4 differs in certain respects from the construction of the U-trough 13 and the anti-flood sleeve 30 of FIG. 2. The outlet section 13A at the open end of the U-trough 13 (FIG. 2) has been eliminated in the feeder assembly 40 shown in FIG. 4. The elimination of this outlet assembly is made possible by the anti-flood sleeve 43. The purpose of the anti-flood sleeve 43 is to provide a frictional resistance to flow of material along the helical path of screw conveyor 12. Since providing such a path was also the function of the outlet section 13A, the outlet section 13A is no longer necessary.

The anti-flood sleeve 43 connects directly to the open end of the U-trough 41 lugs and nut and bolt combinations (not shown) similar to those described heretofore with respect to FIGURES 2 and 3. The material to be packed is placed in the hopper 42. The material passes into that portion of the U-trough 41 not taken up by the anti-flood sleeve 43. The material in the U-trough 41 attempts to flow along the helical path formed by the anti-flood sleeve 43 and the screw conveyor 12, due to the pressure exerted thereon by the material contained in the hopper 42. However, the helical path is of sufficient length to prevent the flow of material out of the spout 45 unless the screw conveyor 12 is rotated. Rotation of the screw conveyor 12 provides positive displacement of the material to be packed along the helical path of the conveyor screw 12 and out of the spout 45. When the rotation of the conveyor screw is terminated, the frictional resistance again prevents the flow of material.

By utilizing anti-flood sleeves of the different lengths, materials of different densities may be packed satisfactorily. By utilizing screw conveyors having different spacings between the flights 26 as well as different flight widths and the different diameters of axles 25, different particle sizes may be satisfactorily packed. In addition, the annular thickness of the anti-flood sleeve 43 may be varied to provide accommodation for different particle sizes.

The bag packer feeder assembly 40 has a removable hopper 42. Satisfactory feeding of material into the hopper 42 is dependent upon the construction of the U-trough 41 is dependent upon the construction of the hopper 42. For certain materials, agitation of the material is necessary to insure continuous flow of material into the U-trough 41. The horizontal ribbon agitator 47 of the removable hopper 42 serves to agitate the material contained in the hopper so as to insure such a continuous flow. In addition, the actual physical configuration of the hopper assists in the satisfactory flow characteristic. Therefore, by utilizing one of several configurations of hoppers, which may or may not have horizontal ribbon agitators, as is appropriate for the material to be packed, together with the appropriate anti-flood sleeve and conveyor screw, a practically infinite variety of materials may be satisfactorily packed. The various combinations obtainable with a relatively few configurations of hoppers, screw conveyors, and anti-flood sleeves will suffice to provide satisfactory packing for essentially all materials to be packed.

The present invention has the additional advantage of providing a device, a plurality of which may be utilized in parallel as multiple outlet packers. Parallel operation is facilitated by making the width of the hopper 42 equal to the width of the supporting frame which contains the weighing mechanism of the packer. Referring to FIG. 5, a plurality of bag packer feeder assemblies 40 are aligned side by side. Each of the bag packer feeder assemblies 40 has a supporting frame 49. The supporting frames are adjacent and may be connected together. The inlet portions of the hoppers 42 form an essentially continuous inlet area 50.

A hopper feeder adapted to feed the particular number of hoppers utilized is connected to the hopper inlets so as to cover the inlet area 50. The hopper feeder may consist, for example, of a bin 51 having a bottom discharge opening 52 adapted to connect with the combined hopper inlet areas. Material to be packed is placed in the bin 51 and is fed through the individual hoppers 42 to the individual screw conveyors. Rotation of a screw conveyor thereby feeds the material to the spout and into the bag.

The use of packers in parallel provides an increase in the material handling capacity of the device in proportion to the increase in the number of packers utilized and enables a single bin to feed at the rate desired for the packing of the material.

I claim:

1. Apparatus for packing materials comprising a hopper for receiving and containing the material to be packed, a U-trough attached to the lower end of the hopper and having an opening at one end thereof, a screw conveyor disposed in the U-trough and extending out of said opening, an anti-flood sleeve disposed in the U-trough so as to enclose a portion of the length of the screw conveyor therewithin adjacent said opening, the sleeve having a length selected so that the length of the screw conveyor enclosed thereby is such, with respect to the flow characteristics of the material to be packed, as to increase the frictional resistance of the material to flow along the screw conveyor to a resistance which prevents flooding of the screw conveyor by the material during packing, and means for releasably attaching the anti-flood sleeve to the U-trough.

2. Apparatus of claim 1 and in which the means of releasably attaching the anti-flood sleeve to the U-trough comprises a plurality of mating pairs of lugs, one lug of each pair being fixed to the U-trough and the other lug of each pair being fixed to the sleeve, said lugs having apertures extending therethrough which are in alignment when the lugs are in mating engagement, and nut and bolt combinations extending through the apertures of the mating lug pairs to attach the sleeve to the U-trough.

3. Apparatus for packing materials comprising a hopper for receiving and containing material to be packed, a U-trough attached to the lower end of the hopper, a screw conveyor adapted to be inserted in the U-trough and to extend out an open end thereof, a plurality of anti-flood sleeves of different length, each of said sleeves being of a length such as to be operable to enclose a different length of the screw conveyor when the screw conveyor and anti-flood sleeve are inserted into the U-trough, anti-flood sleeve attaching means for releasably attaching the sleeve to the U-trough adjacent the open end thereof so as to enclose said length of the screw conveyor.

4. Apparatus of claim 3 and in which the sleeve attaching means comprises complementary mating lugs on the sleeve and U-trough having apertures extending therethrough, and means including bolts for attaching said mating lugs to fix the sleeve to the U-trough.

References Cited in the file of this patent

UNITED STATES PATENTS

| 1,862,752 | Jones et al. | June 14, 1932 |
| 1,880,840 | Currier | Oct. 4, 1932 |
| 2,055,725 | Johnson | Sept. 29, 1936 |
| 2,279,613 | Blue | Apr. 14, 1942 |
| 2,517,954 | Zenke | Aug. 8, 1950 |
| 2,687,244 | Peterson | Aug. 24, 1954 |
| 2,746,083 | King | May 22, 1956 |
| 2,794,577 | Van Leeuwen | June 4, 1957 |
| 2,800,252 | Wahl | July 23, 1957 |
| 2,831,612 | Smith | Apr. 22, 1958 |